(12) United States Patent
Wang et al.

(10) Patent No.: US 11,490,055 B2
(45) Date of Patent: Nov. 1, 2022

(54) SYSTEM AND METHOD FOR CROP STRESS EARLY WARNING BASED ON TEMPERATURE AND IMAGE

(71) Applicant: Nanjing Agricultural University, Nanjing (CN)

(72) Inventors: Xiaochan Wang, Nanjing (CN); Lujie Zhong, Nanjing (CN); Haolin Yang, Nanjing (CN); Ye Jiang, Nanjing (CN); Yanpeng Wang, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 0 days.

(21) Appl. No.: 17/495,856

(22) Filed: Oct. 7, 2021

(65) Prior Publication Data
US 2022/0159218 A1   May 19, 2022

(30) Foreign Application Priority Data
Nov. 18, 2020 (CN) .......................... 202011291557.7

(51) Int. Cl.
| | |
|---|---|
| H04N 7/18 | (2006.01) |
| H04N 5/232 | (2006.01) |
| G06V 10/30 | (2022.01) |
| G06V 20/10 | (2022.01) |
| G05D 1/02 | (2020.01) |
| G06T 7/00 | (2017.01) |

(52) U.S. Cl.
CPC ............ *H04N 7/183* (2013.01); *G05D 1/021* (2013.01); *G06T 7/0012* (2013.01); *G06V 10/30* (2022.01); *G06V 20/188* (2022.01); *H04N 5/23299* (2018.08); *G05D 2201/0201* (2013.01); *G05D 2201/0207* (2013.01); *G06T 2207/10048* (2013.01); *G06T 2207/30188* (2013.01)

(58) Field of Classification Search
CPC .................. H04N 7/183; G05D 1/021; G05D 2201/0201; G05D 2201/0207; G06T 2207/10048; G06T 2207/30188
See application file for complete search history.

(56) References Cited

U.S. PATENT DOCUMENTS

| | | | |
|---|---|---|---|
| 2015/0015697 A1* | 1/2015 | Redden ..................... | A01G 7/00 382/110 |
| 2020/0320682 A1* | 10/2020 | Alexander ........... | G06V 10/507 |

* cited by examiner

*Primary Examiner* — Kathleen V Nguyen
(74) *Attorney, Agent, or Firm* — Keating & Bennett, LLP (57) ABSTRACT

An infrared thermal imager and an OpenMV machine vision module provided in a data acquisition device are used to collect crop surface temperature data and image data, respectively, and transmit the data to a computer for processing by a Raspberry Pi module via a wireless transmission module. After reading the image data, the computer obtains color components and growth parameters of the crop, and merges the color components and temperature data to assist in building an early warning model. The system and method enable real-time, continuous and nondestructive monitoring of crop growth information to provide references for adjustment and control of greenhouse environmental parameters.

5 Claims, 3 Drawing Sheets

SYSTEM AND METHOD FOR CROP STRESS EARLY WARNING BASED ON TEMPERATURE AND IMAGE

CROSS REFERENCE TO RELATED APPLICATIONS

This patent application claims the benefit and priority of Chinese Patent Application No. 202011291557.7 filed on Nov. 18, 2020, the disclosure of which is incorporated herein by reference in its entirety.

BACKGROUND OF THE INVENTION

1. Field of the Invention

The present disclosure relates to the technical field of crop phenotypic information collection and stress early warning, and in particular to a system and a method for crop stress early warning based on the temperature and image.

2. Description of the Related Art

Various environmental factors unfavorable to crop growth are referred to as adversity or stress. According to causes of stress on crops, stress is usually categorized into two types: biotic stress and abiotic stress (also called physical and chemical stress). Among the two types, the biotic stress mainly refers to stress due to plant diseases, insect pests, and weeds, while the abiotic stress mainly includes stress caused by water, temperature, chemical factors, radiation, snow, hail and other factors. Crops are often subjected to various biotic and abiotic stresses during the growth, which seriously affect the crop growth and reduce the crop yield. Therefore, the way of identifying the factors causing crop stress in advance and taking appropriate control measures is the key to ensure agricultural development.

Among crop stress detection methods in the prior art, satellite remote sensing monitoring is usually adopted for large-scale crops, while manual field visits are mostly performed for small-scale crops. In addition, physical and chemical means are also used for detection sometimes. Remote sensing monitoring is used to determine the stress state of crop growth by analyzing and extracting data from satellite images by using the spectral theory. This method is expensive due to equipment required, weak in timeliness, low in accuracy, and inconvenient in verification necessitating the ground truth. The method of manual on-the-spot investigation is simple and feasible, which allows comprehensive observation, but it is labor intensive, time consuming, effort-devoted and inefficient. It requires an observer to have rich experience and expertise of crop production, and the observation results are relatively subjective and cannot realize real-time monitoring. Although the physical and chemical means are used to monitor the crop stress at a high accuracy, there exist some problems such as complicated steps, expensive equipment, the difficulty in monitoring large areas of farmland, and the harm to crops themselves.

SUMMARY OF THE INVENTION

In view of disadvantages in the prior art, the present disclosure provides systems and methods for crop stress early warning based on temperature and image, which respectively collect the temperature and image data of crops by using an infrared thermal imager and an OpenMV machine vision module, transmit the data to a computer for analysis, calculate to obtain crop growth parameters, and merge the temperature and image color parameters to assist in building an early warning model, thus enabling more convenient and faster determination of the crop stress condition, suggestions and references for subsequent decision-making, and real-time monitoring of crop growth condition.

A crop stress early warning system based on temperature and image is provided, which includes a data acquisition device including an electric box installed on an upper surface of a bottom plate, a storage battery and an embedded Raspberry Pi module are connected by wires and arranged in the electric box, a plurality of universal wheels are installed on a lower surface of the bottom plate, and the universal wheels are respectively connected with corresponding driving motors which are connected with the embedded Raspberry Pi module by wires; a vertical rod is arranged on the upper surface of the bottom plate, a first telescopic rod and a second telescopic rod are mounted on a surface of the vertical rod that are perpendicular to the vertical rod and adjustable in height; another end of the first telescopic rod is provided with an infrared thermal imager, and another end of the second telescopic rod is provided with an OpenMV machine vision module; the embedded Raspberry Pi module is respectively connected with the infrared thermal imager and the OpenMV machine vision module through wires; a wireless transmission module is installed above the electrical box, and the embedded Raspberry Pi module is connected with a computer via a wireless transmission module and a router in turn.

Further, the other end of the first telescopic rod and the other end of the second telescopic rod are respectively provided with the infrared thermal imager and the OpenMV machine vision module through a ball rotary shaft.

Further, the first telescopic rod and the second telescopic rod are adjustable in height via a fixation knob.

An early warning method by using the crop stress early warning system is provided, which includes: turning on the storage battery to supply power, and sending, by the embedded Raspberry Pi module, an instruction to a driving motor to drive the universal wheels to rotate such that the data acquisition device moves according to a preset route and stops at a designated acquisition point; adjusting the height of the first telescopic rod and the second telescopic rod and fixing the first and second telescopic rods, adjusting the infrared thermal imager and the OpenMV machine vision module to an angle aiming at the crop for performing data acquisition; transmitting the acquired image data and temperature data to the computer by the embedded Raspberry Pi module via the wireless transmission module, and obtaining, by the computer, color components and growth parameters of the crop, and fits the color components with the read temperature data to assist in building the early warning model.

Further, the computer pre-processes the image before obtaining the color components and growth parameters of the crop, wherein the preprocessing process includes: converting the read RGB image into a binary image and obtaining a corresponding threshold, and substituting the threshold as a standard of filtering and eliminating redundant information into an arithmetic mean filtering algorithm for filtering so as to remove noise points and impurities in the image; and mapping the filtered image to an Lab color space to obtain an Lab value of the color components; using an Otsu method to segment the crop image from a background image for binarization; and using a threshold area elimination method to remove residual noise points in the binarized image.

Further, fitting the color components with the read temperature data by the computer includes: analyzing and fitting the leaf surface temperature, the Lab value and the CWSI value of the crop by Curve Expert or Origin so as to obtain a relationship curve model which is the early warning model, the CWSI value obtained by the early warning model being a model simulation CWSI value; and a formula for obtaining an experimentally measured CWSI value being expressed as:

$$CWSI = \frac{T_{plant} - T_{wet}}{T_{dry} - T_{wet}}$$

where $T_{plant}$ represents a temperature of a crop canopy area in a standard environment, $T_{wet}$ represents a mean temperature of a wet artificial reference surface, and $T_{dry}$ represents a mean temperature of a dry artificial reference surface.

Further, the process of testing the early warning model includes: testing the early warning model with the root mean square error method, with a testing formula being expressed as:

$$RMSE = \sqrt{\frac{\sum_{i=1}^{n}(O_i - S_i)^2}{n}}$$

where $O_i$ represents the experimentally measured CWSI value; $S_i$ represents the model simulation CWSI value; i represents a sample serial number; n represents a sample capacity; the smaller the RMSE value is, the smaller a deviation between the model simulation CWSI value and the experimentally measured CWSI value will be, and the higher the prediction accuracy of the early warning model will be.

Further, obtaining, by the computer, the growth parameters of the crop includes: using the growth parameters including plant height, stem diameter and crown width area of the crop, and a white square acrylic plate sized 2 cm×2 cm as a calibration object to assist in obtaining the growth parameters; the formula used to calculate the crown width area of the crop being expressed as:

$$S = \frac{S_0}{N_0} \times N$$

where $S_0$ represents the area of the calibration object, $N_0$ represents a number of pixel points in the calibration object area, N represents a number of pixel points in the crop area, and S represents the crown width area of the crop in the image area; in the binarized image of the crop, the threshold of the white part is 1 and the threshold of the black part is 0; the binarized image of the crop is scanned line by line from top to bottom, and a first point scanned with the threshold of 1 is recorded as the coordinate of $(x_1, y_1)$, a last point scanned with the threshold of 1 is record as the coordinate of $(x_j, y_j)$, the number of pixel points of the plant height is $y_j - y_1$, and then the plant height is calculated as:

$$H = \sqrt{\frac{S_0}{N_0}} \times (y_j - y_1)$$

where H represents an actual plant height; $x_j$ represents abscissa of the last point with the threshold of 1; $y_j$ represents ordinate of the last point with the threshold of 1; $x_1$ represents abscissa of the first point with the threshold of 1; and $y_i$ represents ordinate of the first point with the threshold of 1; and scanning the binarized image of the crop line by line, wherein in each line, the scanned point where the threshold changes from 0 to 1 is recorded as the coordinate of $(x_k, y_k)$, the scanned point where the threshold changes from 1 to 0 is recorded as the coordinate of $(x_m, y_m)$, and the stem diameter value d of each line is recorded in turn, d= $\sqrt{(x_m-x_k)^2+(y_m-y_k)^2}$, so that the actual stem diameter of the crop is:

$$L = \sqrt{\frac{S_0}{N_0}} \times d_{max}$$

where L represents the actual stem diameter; $d_{max}$ represents the maximum stem diameter among all lines scanned; $x_k$ represents abscissa of the point where a threshold changes from 0 to 1 in each line; $y_k$ represents ordinate of the point where a threshold changes from 0 to 1 in each line; $x_m$ represents abscissa of the point where a threshold changes from 1 to 0 in each line; and $y_m$ represents ordinate of the point where a threshold changes from 1 to 0 in each line.

Further, the infrared thermal imager and the OpenMV machine vision module perform the parameter adjustment before data acquisition, including adjustment of the temperature reading range, focal length, pixel, image length and width, and image acquisition mode.

Further, the computer starts a preview function at first, waits for buffer input of RGB images, then uses SPI to read and write, and, after loop reading of the images, selects the images for processing.

In comparison to the prior art, the present disclosure provides the following beneficial effects:

(1) The embedded machine vision technology is adopted in the present disclosure so as to monitor the crop growth information in real time, continuously and non-destructively, and to automatically obtain the crop color, shape and temperature indexes, thus facilitating the reference for the adjustment and control of greenhouse environmental parameters. The present disclosure may also eliminate unnecessary errors to a great extent, which allows the improvement of agricultural automation. The machine vision technology enables fast data acquisition and the ability of processing a large amount of data without human intervention, which can be easily combined with computer software for operations such as control and analysis, thus improving the operation efficiency and achieving data analysis with higher accuracy.

(2) The whole stress early warning system, including a combination of software and hardware, has a high level of intelligence and is simple in operation, which can solve the problem of automatic data acquisition, and helps carry out repeatable physical and chemical stress tests. By analyzing the real-time monitored data and providing qualitative and quantitative information, the system can not only help growers better monitor all aspects of the crop growth, manage resources, prevent pests, plant diseases, and crop temperature and water stress, but also improve the overall crop production quality, reduce human fatigue, and achieve the intelligentization and modernization of crop planting. This system also improves the precision of irrigation and fertilization decision-making by automatic diagnosis and early warning method of crop stress state.

(3) The embedded system and equipment adopted in the present disclosure can be generalized and improved, and show better expansibility; by combining the technologies such as machine vision, software control, and image processing, a brand-new technical platform is provided for automatic diagnosis and early warning against crop stress based on the crop phenotype information collection technology.

The above and other elements, features, steps, characteristics and advantages of the present invention will become more apparent from the following detailed description of the preferred embodiments with reference to the attached drawings.

DETAILED DESCRIPTION OF THE EMBODIMENTS

The present disclosure will be further described with reference to accompanying figures and embodiments below, without limiting the protection scope of the present disclosure.

In the description of the present disclosure, it should be noted that the terms such as "installation" should be understood in a broad sense. For example, installation may refer to either a fixed connection, a detachable connection, or an integrated connection in a way of either direct connection, indirect connection through an intermediate media, or the communication intra two elements. For ordinary technicians in the art, the specific meanings of the above terms in the present disclosure can be understood according to specific situations.

Figure 1:
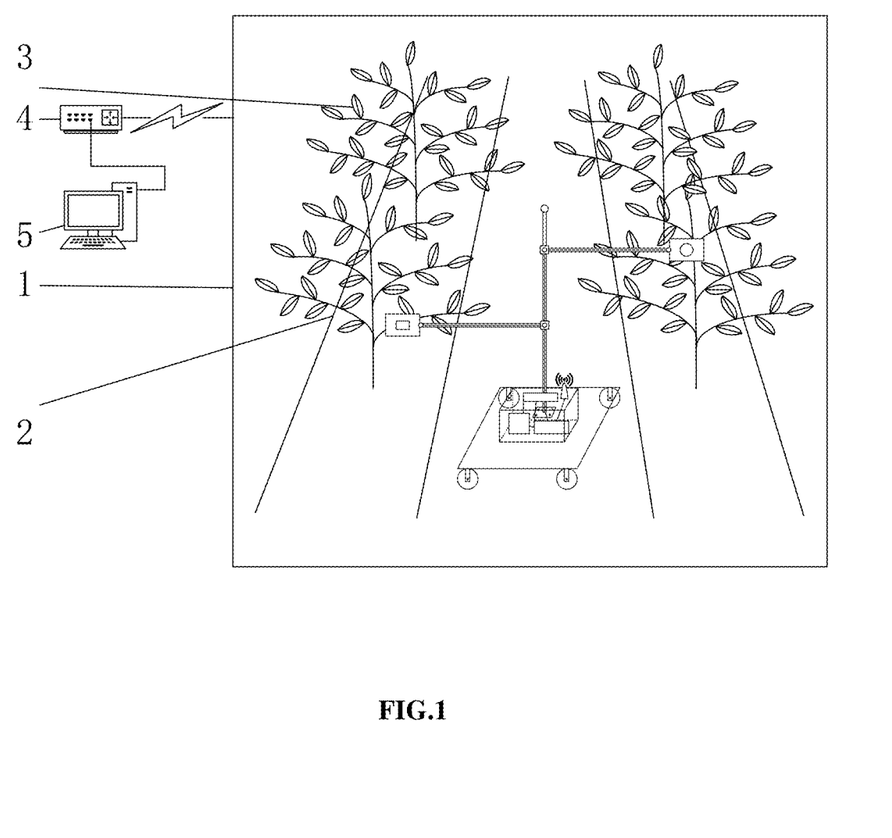
FIG. 1 is a schematic diagram of operation of a crop stress early warning system according to the present disclosure.

Taking a crop 3 in a greenhouse 1 as an example, as shown in FIG. 1, the crop stress early warning system according to the present disclosure uses a data acquisition device to collect image data and temperature data of the crop 3 on each seedbed 2 in the greenhouse 1, transmits the collected data to a client computer 5 outside the greenhouse 1 for processing, builds an early warning model, and monitors the growth of the crop 3 in real time.

Figure 2:
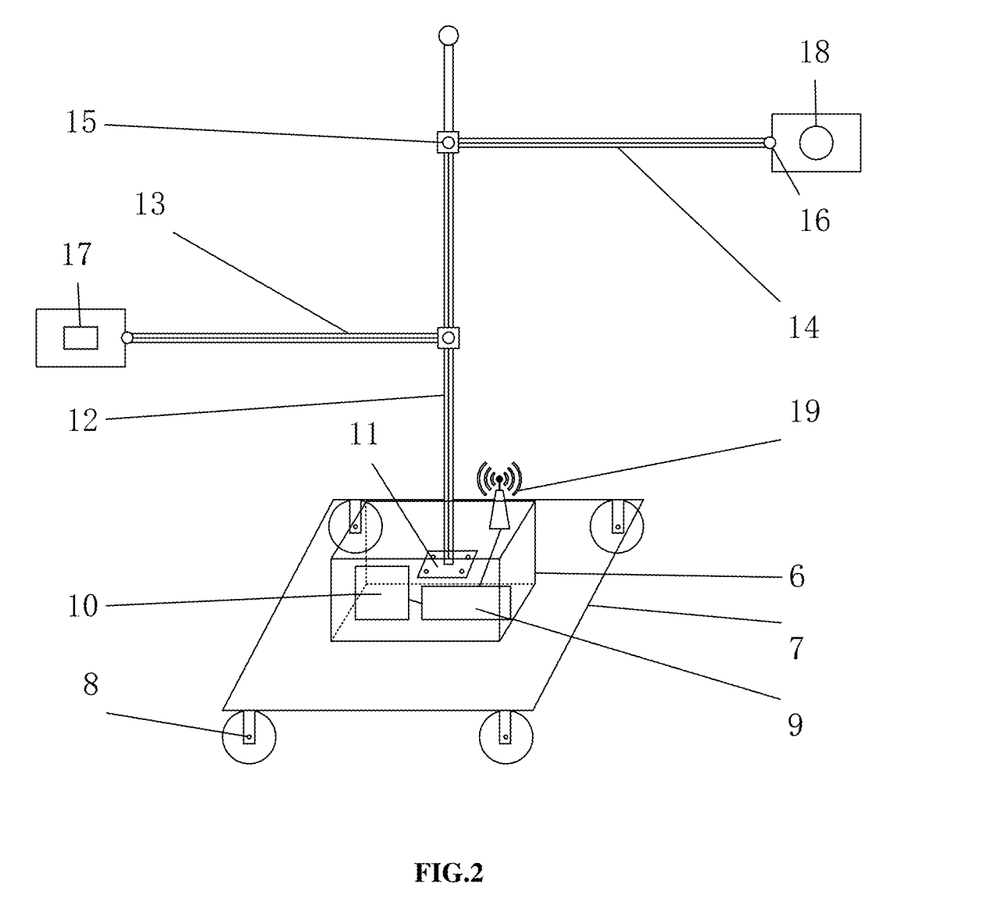
FIG. 2 is a schematic diagram of a structure of a data acquisition device according to the present disclosure.

As shown in FIGS. 1 and 2, the data acquisition device includes an electrical box 6 installed on the upper surface of a bottom plate 7 preferably made of aluminum, and a storage battery 10 connected by wires and an embedded Raspberry Pi module 9 are arranged in the electrical box 6. The lower surface of the bottom plate 7 is provided with a plurality of universal wheels 8, each universal wheel 8 is connected with a corresponding driving motor, and the driving motor is connected with the embedded Raspberry Pi module 9 by wires. A control instruction written in advance based on the greenhouse path is stored within the embedded Raspberry Pi module 9, which can control the driving motor to work, so that the driving motor drives the universal wheels 8 to rotate, and in turn drives the whole data acquisition device to move in the greenhouse 1 to collect information of the crop 3. A five-hole plate 11 is also installed on the upper surface of the bottom plate 7, and a vertical rod 12 is vertically welded on the upper surface of the five-hole plate 11. A first telescopic rod 13 and a second telescopic rod 14 are installed on the surface of the vertical rod 12 and perpendicular to the vertical rod 12. The first telescopic rod 13 and the second telescopic rod 14 are adjustable in height by a fixation knob 15. An infrared thermal imager 17 is installed at the other end of the first telescopic rod 13 through a ball rotary shaft 16 for collecting temperature data of the crop 3. In this embodiment, an AMG8833 infrared thermal imager 17 is preferably used, which can read the real-time temperature of an 8×8 square area in the lens at one time, namely the real-time temperature at 64 points. An OpenMV machine vision module 18 is installed at the other end of the second telescopic rod 14 through a ball rotary shaft 16, which is used for collecting image data of the crop 3 and can capture RGB color digital images of 640×480 pixels. The arrangement of the ball rotary shafts 16 allow adjustable angles of the infrared thermal imager 17 and the OpenMV machine vision module 18, thus effectively ensuring the accuracy of data acquisition. The embedded Raspberry Pi module 9 is respectively connected with the infrared thermal imager 17 and the OpenMV machine vision module 18 by wire for controlling data acquisition and receiving temperature data and image data of the crop 3. A wireless transmission module 19 is installed above the electrical box 6. The embedded Raspberry Pi module 9 can transmit the received data information to a router 4 outside the greenhouse 1 through the wireless transmission module 19, and then transmit the data to the client computer 5 through the router 4 for analysis and processing, thereby building an early warning model. At the same time, the client computer 5 can also remotely control the embedded Raspberry Pi module 9 through the wireless transmission module 19 by instructions.

Figure 3:
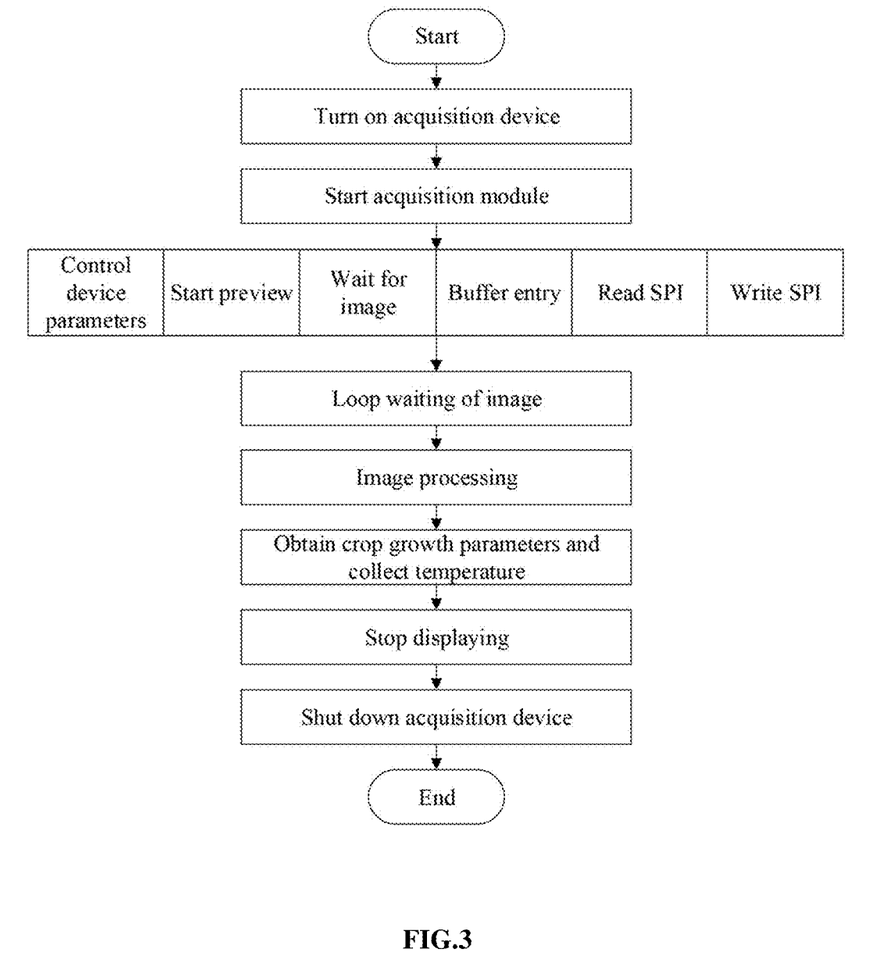
FIG. 3 is a flow chart of the data acquisition according to the present disclosure.

Before data acquisition, the terrain of the whole greenhouse 1 is recorded at first, the travel route of the data acquisition device is planned according to the position and line spacing of the crop 3 in the greenhouse 1. Acquisition stops are planned for the data acquisition device according to the plant spacing of the crop 3. Then, based on the planned data, a control instruction is written in the embedded Raspberry Pi module 9 to control the movement of the universal wheels 8, and in turn control the data acquisition device to travel and stop in the greenhouse 1 along the route generated according to the preset instruction. During the information acquisition, as shown in FIG. 3, the storage battery 10 is firstly turned on to supply power, and the embedded Raspberry Pi module 9 sends an instruction to the driving motor to drive the universal wheels 8 to rotate, so as to ensure that the data acquisition device travels according to the preset route and stops at designated acquisition points. The first telescopic rod 13 and the second telescopic rod 14 are adjusted and fixed at a proper height by adjusting the fixation knob 15, then the telescopic rods are drawn out to adjust the infrared thermal imager 17 and the OpenMV machine vision module 18 to a proper angle by adjusting the ball rotary shaft 16 to aim at the crop 3, so as to ensure accurate acquisition. Then, the parameters of infrared thermal imager 17 and OpenMV machine vision module 18 are adjusted, including the adjustment of parameters such as temperature reading range, focal length, pixel, image length and width, image acquisition mode. Once the adjustment is completed, the data can be acquired. The acquired image data and temperature data of the crop 3 are transmitted to the embedded Raspberry Pi module 9, which in turn transmits the data to the client computer 5 via the wireless transmission module 19 for processing. The client computer 5 starts the preview function, waits for the buffer input of RGB images, and then uses SPI (Serial Peripheral Interface) to read and write. After loop reading of the images, the computer selects appropriate images for processing and calculates the growth parameters of the crop 3. At the same time, the client computer 5 also reads the temperature data of the crop 3 surface, merges the temperature data with the color parameters of the crop 3 obtained from the image data to build an early warning model. The client computer 5 will automatically store the information data every time it receives the data. After the data acquisition is finished, the client computer 5 sends an instruction to the Raspberry Pi module 9 via the wireless transmission module 19 to stop collecting data and to turn off the data acquisition device.

The early warning system of the present disclosure is used to process the image data of the crop 3, so as to obtain the growth parameters of the crop 3, establish an early warning model, and implement the monitoring and early warning method for the growth of the crop 3, which mainly includes two portions including the following specific steps described below.

In the first portion, the building process of early warning model includes:

Step 1: Filtering: Traditional filtering methods include median filtering, Gaussian filtering, and arithmetic mean filtering, etc. In this embodiment, the arithmetic mean filtering method is preferred to process the images. The read RGB image is converted into a binary image, and a corresponding threshold is obtained. The threshold as the standard of filtering and eliminating redundant information is substituted into an arithmetic mean filtering algorithm for filtering so as to remove noise points and impurities in the image, in order to avoid interference with subsequent image processing and improve image quality.

Step 2: Color space conversion: color spaces include an RGB color space, an HSV color space, an Lab color space, etc. In this embodiment, the image processed in Step 1 is preferably mapped to the Lab color space. The Lab color space includes three elements: L for brightness, a for magenta to green, b for yellow to blue, where L is ranged from 0 to 100. All colors can be composed of these three values which are varied differently from each other. After mapping the image to the Lab color space, the color components, namely the Lab value, can be obtained.

The client computer 5 reads and stores the temperature data of the crop 3 in real time, stores the color component data obtained through real-time processing, and builds an early warning model according to the data for determining the growth, pests and diseases, and the stress state of the crop 3, thereby realizing the real-time monitoring and stress early warning of the crop 3 and providing suggestions and references for subsequent decision-making on improving the yield of the crop 3. In this process, the client computer 5 uses the statistical analysis software SPSS to perform analysis of variance (ANOVA) and least significant difference (LSD) on the collected data, finds and removes abnormal data. Among the numerous stress factors, only water stress can be expressed intuitively and quantitatively, so in this embodiment the water stress of the crop 3 is taken as an example for illustration. Crop 3 water stress index (CWSI) is an important standard of determination of the water deficit according to the canopy temperature data of the crop 3. In this embodiment, CWSI is used as a reference standard, namely the CWSI value measured by experiment. The CWSI values of different crops 3 are obtained by calculating the ratio of the difference between the canopy temperature of the crop 3 and the wet reference surface temperature to the temperature difference between dry and wet reference surfaces. The specific calculation formula is as follows:

$$CWSI = \frac{T_{plant} - T_{wet}}{T_{dry} - T_{wet}} \quad (1)$$

In the formula, $T_{plant}$ represents the temperature of the crop 3 canopy area in the standard environment (in the unit of ° C.); $T_{wet}$ represents the mean temperature of a wet artificial reference surface (in the unit of ° C.); and $T_{dry}$ represents the mean temperature of a dry artificial reference surface 3 (in the unit of ° C.).

The leaf surface temperature, the color space Lab value and the CWSI value of the crop 3 are analyzed and fitted by curve fitting software Curve Expert or Origin so as to obtain a relationship curve model which is the early warning model, and the CWSI value obtained by the model is the model simulation CWSI value.

During the model verification, the root-mean-square error (RMSE) method, relative error (RE) method or the coefficient of concordance (COC) method are usually used to compare the model simulation value with the experimentally measured value, and analyze the level of fitting. In this embodiment, the root-mean-square error (RMSE) method is preferred with its test formula being as follows:

$$RMSE = \sqrt{\frac{\sum_{i=1}^{n}(O_i - S_i)^2}{n}} \quad (2)$$

In the formula, $O_i$ represents the experimentally measured CWSI value; $S_i$ represents the model simulation CWSI value; represents the sample serial number; and n represents the sample capacity.

During the model verification, the smaller the RMSE value is, the smaller a deviation between the model simulation CWSI value and the experimentally measured CWSI value will be, and the higher the prediction accuracy of the model will be. In addition, the accuracy of the simulation value and the measured value can be visually demonstrated by a 1:1 straight line and its regression equation determining coefficient ($R^2$).

In the second part, the acquisition process of the growth of the crop 3 includes:

Step 3: Image segmentation: traditional image segmentation methods include iterative threshold segmentation method, global threshold segmentation method, and maximum variance between classes (Otsu), etc. The Otsu method is obtained on the basis of gray-level histogram by virtue of the least square principle, which has the best statistical significance and facilitates pixel calculation. Therefore, in this embodiment, an Otsu method is preferably used to process the image processed in Step 1, so as to segment the crop image out from the background image for binarization, thereby showing the whole image in a significant black and white effect.

Step 4: Morphological processing: residual noise points in the binarized image are removed by an Area Threshold Removal method. Firstly, a point with a pixel value of 1 in the binarized image is marked by an 8-neighborhood connected-domain marking method, and each resultant connected domain is marked. Then, the area statistics is performed for each connected domain, and a threshold that can meet the noise point elimination requirement is given by comparison. If the connected domain area is less than the threshold, the pixel value of the pixel in this domain is changed from 1 to 0, and the corresponding noise points are removed. This method can also be used to eliminate the area for a specific area on the image.

Growth parameters of the crop 3 are divided into three aspects: individual characteristics, population characteristics and comprehensive characteristics. The individual characteristic parameters include plant height, stem diameter, leaf number, leaf shape, leaf color and crown area, the population characteristic parameters include planting density, plant spacing and row spacing, and the comprehensive characteristic parameters mainly refer to leaf area index. In this embodiment, the most representative parameters among the individual characteristic parameters are plant height, stem diameter and crown area are preferably selected to characterize the growth of the crop 3. The specific calculation process is as follows:

During the measurement and calculation of the height, stem diameter and crown area of the crop 3, it is necessary to use a 2 cm×2 cm white square acrylic board prepared in advance as a calibration object, take the known calibration object area as the reference, and calculate the height, stem diameter and crown area of the crop 3 according to the number of pixel points in the calibration object area and the crop area.

So is the area of the calibration object; No is the number of pixel points in the calibration object area; N is the number of pixel points in the crop 3 area; and the crown width area of the crop 3 in the image area is:

$$S = \frac{S_0}{N_0} \times N \tag{3}$$

where $S_0$ represents the area of the calibration object; $N_0$ represents the number of pixel points in the calibration object area; N represents the number of pixel points in the crop 3 area; and S represents the crown width area of the crop 3 in the image area.

In the crop 3 image binarized in Step 3, the threshold of the white part is 1 and the threshold of the black part is 0. After binarization, all the crown parts of the crop are white parts and all the background parts are black parts. By scanning the binarized image line by line and accumulating the number of scanned points with a threshold of 1, the accuracy of calculation can bed effectively ensured. When calculating the plant height, the binarized front image of the crop 3 is scanned line by line from top to bottom in the unit of line. Since the portion of the image that has the crop 3 is white, a first point scanned with the threshold of 1 is recorded as the coordinate of $(x_1, y_1)$, the last point scanned with the threshold of 1 is record as the coordinate of $(x_j, y_j)$, the number of pixel points of plant height is $y_j - y_1$, and then the plant height H is calculated as:

$$H = \sqrt{\frac{S_0}{N_0}} \times (yj - y1) \tag{4}$$

where H represents the actual plant height; $x_j$ represents the abscissa of the last point with a threshold of 1; $y_j$ represents the ordinate of the last point with a threshold of 1; $x_1$ represents the abscissa of the first point with a threshold of 1; and $y_1$ represents the ordinate of the first point with a threshold of 1.

During the calculation of the stem diameter, the binarized front image of the crop 3 is scanned line by line. In each line, the scanned point where the threshold changes from 0 to 1 is recorded as the coordinate of $(x_k, y_k)$, the scanned point where the threshold changes from 1 to 0 is recorded as the coordinate of $(x_m, y_m)$, and the stem diameter value d of each line is recorded in turn, $d = \sqrt{(x_m - x_k)^2 + (y_m - y_k)^2}$, so that the actual stem diameter of the crop 3 is:

$$L = \sqrt{\frac{S_0}{N_0}} \times d_{max} \tag{5}$$

where L represents the actual stem diameter; $d_{max}$ represents the maximum stem diameter among all lines scanned; $x_k$ represents the abscissa of the point where a threshold changes from 0 to 1 in each line; $y_k$ represents the ordinate of the point where a threshold changes from 0 to 1 in each line; $x_m$ represents the abscissa of the point where a threshold changes from 1 to 0 in each line; and $y_m$ represents the ordinate of the point where a threshold changes from 1 to 0 in each line.

The universal wheels and the bottom plate in the crop stress early warning system according to the present disclosure can be replaced with mobile robots and other structures, the ball rotary shaft can be replaced with a mobile cradle head and other structures, and the telescopic rods and the ball rotating shafts can also be electrically controlled. Therefore, the embodiments are all preferred embodiments of the present disclosure. However, the present disclosure is not limited to the above embodiments. Without departing from the important features of the present disclosure, all obvious improvements, substitutions or modifications that can be made by a person skilled in the art are included in the protection scope of the present disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An early warning method for crop stress early warning system based on temperature and image, the early warning system comprising a data acquisition device including an electric box installed on an upper surface of a bottom plate, a storage battery and an embedded Raspberry Pi module connected by wires and arranged in the electric box, a plurality of universal wheels installed on a lower surface of the bottom plate, and the universal wheels are respectively connected with corresponding driving motors which are connected with the embedded Raspberry Pi module, a vertical rod is arranged on the upper surface of the bottom plate, a first telescopic rod and a second telescopic rod are mounted on a surface of the vertical rod that are perpendicular or substantially perpendicular to the vertical rod and adjustable in height, an end of the first telescopic rod is provided with an infrared thermal imager, and an end of the second telescopic rod is provided with an OpenMV machine vision module, the embedded Raspberry Pi module is respectively connected with the infrared thermal imager and the OpenMV machine vision module, a wireless transmission module is installed above the electrical box, and the embedded Raspberry Pi module is connected with a computer via a wireless transmission module and a router, the ends of the first and second telescopic rods are respectively provided with the infrared thermal imager and the OpenMV machine vision module through a ball rotary shaft, the early warning method comprising:

turning on the storage battery to supply power;

sending, by the embedded Raspberry Pi module, an instruction to a driving motor to drive the universal wheels to rotate such that the data acquisition device moves according to a preset route and stops at a designated acquisition point;

adjusting a height of the first telescopic rod and the second telescopic rod and fixing the first and second telescopic rods;

adjusting the infrared thermal imager and the OpenMV machine vision module to an angle aiming at the crop for performing data acquisition;

transmitting acquired image data and temperature data to the computer by the embedded Raspberry Pi module via the wireless transmission module;

obtaining, by the computer, color components and growth parameters of the crop, and fitting the color components with the temperature data to assist in building an early warning model;

pre-processing, by the computer, the image before obtaining the color components and growth parameters of the crop; wherein the preprocessing comprises:

converting a read RGB image into a binary image and obtaining a corresponding threshold;

substituting the threshold as a standard of filtering and eliminating redundant information into an arithmetic mean filtering algorithm for filtering so as to remove noise points and impurities in the image;

mapping a filtered image to an Lab color space to obtain an Lab value of the color components;

using an Otsu method to segment a crop image from a background image for binarization; and using a threshold area elimination method to remove residual noise points in a binarized image;

obtaining, by the computer, the growth parameters of the crop comprises:

using the growth parameters including plant height, stem diameter and crown width area of the crop, and a white square acrylic plate sized 2 cm×2 cm as a calibration object to assist in obtaining the growth parameters;

a formula used to calculate the crown width area of the crop being expressed as:

$$S = \frac{S_0}{N_0} \times N$$

where $S_0$ represents an area of the calibration object, $N_0$ represents a number of pixel points in the calibration object area, N represents a number of pixel points in the crop area, and S represents the crown width area of the crop in the image area;

in the binarized image of the crop, the threshold of a white part is 1 and the threshold of a black part is 0;

the binarized image of the crop is scanned line by line from top to bottom, and a first point scanned with a threshold of 1 is recorded as a coordinate of $(x_1, y_1)$, a last point scanned with the threshold of 1 is recorded as a coordinate of $(x_j, y_j)$, a number of pixel points of the plant height is $y_j-y_1$, and the plant height is calculated as:

$$H = \sqrt{\frac{S_0}{N_0}} \times (y_j - y_1)$$

where H represents an actual plant height, $x_j$ represents abscissa of a last point with the threshold of 1, $y_j$ represents ordinate of the last point with the threshold of 1, $x_1$ represents abscissa of a first point with the threshold of 1, and $y_1$ represents ordinate of the first point with the threshold of 1; and scanning the binarized image of the crop line by line, wherein in each line, a scanned point where the threshold changes from 0 to 1 is recorded as a coordinate of $(x_k, y_k)$, a scanned point where the threshold changes from 1 to 0 is recorded as a coordinate of $(x_m, y_m)$, and a stem diameter value d of each line is recorded in turn, $d=\sqrt{(x_m-x_k)^2+(y_m-y_k)^2}$, so that the actual stem diameter of the crop is:

$$L = \sqrt{\frac{S_0}{N_0}} \times d_{max}$$

where L represents the actual stem diameter, $d_{max}$ represents the maximum stem diameter among all lines scanned, $x_k$ represents the abscissa of the point where a threshold changes from 0 to 1 in each line, $y_k$ represents the ordinate of the point where a threshold changes from 0 to 1 in each line, $x_m$ represents the abscissa of the point where a threshold changes from 1 to 0 in each line, and $y_m$ represents the ordinate of the point where a threshold changes from 1 to 0 in each line.

2. The early warning method according to claim 1, wherein the fitting the color components with the read temperature data by the computer comprises: analyzing and fitting a leaf surface temperature, the Lab value and a crop water stress index (CWSI) value of the crop by Curve Expert or Origin so as to obtain a relationship curve model which is the early warning model, the CWSI value obtained by the early warning model being a model simulation CWSI value, and a formula for obtaining an experimentally measured CWSI value being expressed as:

$$CWSI = \frac{T_{plant} - T_{wet}}{T_{dry} - T_{wet}}$$

where $T_{plant}$ represents a temperature of a crop canopy area in a standard environment, $T_{wet}$ represents a mean temperature of a wet artificial reference surface, and $T_{dry}$ represents a mean temperature of a dry artificial reference surface.

3. The early warning method according to claim 2, wherein the testing the early warning model comprises: testing the early warning model with a root mean square error (RMSE) method, with a testing formula being expressed as:

$$RMSE = \sqrt{\frac{\sum_{i=1}^{n}(O_i - S_i)^2}{n}}$$

where $O_i$ represents the experimentally measured CWSI value; $S_i$ represents the model simulation CWSI value; i represents a sample serial number; n represents a sample capacity; the smaller the RMSE value is, the smaller a deviation between the model simulation CWSI value and the experimentally measured CWSI value will be, and the higher the prediction accuracy of the early warning model will be.

4. The early warning system according to claim 1, wherein the infrared thermal imager and the OpenMV machine vision module perform the parameter adjustment before data acquisition, including adjustment of the temperature reading range, focal length, pixel, image length and width, and image acquisition mode.

5. The early warning system according to claim 1, wherein the computer starts a preview function at first, waits for buffer input of RGB images, then uses a Serial Peripheral Interface (SPI) to read and write, and, after loop reading of the images, selects the images for processing.

\* \* \* \* \*